Patented Jan. 9, 1951

2,537,699

UNITED STATES PATENT OFFICE 2,537,699

MAGNETITE CONTAINING CATALYST FOR THE SYNTHESIS OF HYDROCARBONS

Jerry A. Pierce, Baton Rouge, La., assignor to Standard Oil Development Company, a corporation of Delaware No Drawing. Application September 12, 1946, Serial No. 696,627

7 Claims. (Cl. 260—449.6)

My present invention relates to useful catalysts and their use. In particular, it relates to metallic catalysts suitable for use in hydrogenation reactions and/or in the production of hydrocarbons and oxygenated hydrocarbons from reactants containing carbon monoxide and hydrogen, in a synthesis reaction.

Not many catalysts are known to be useful in hydrocarbon synthesis employing carbon monoxide and hydrogen as reactants. In the earlier work in this field cobalt carried on a suitable support, such as kieselguhr, and activated by certain materials, such as thoria, was used as a catalyst. Later, iron catalysts were used in the hydrocarbon synthesis reaction and in many respects these catalysts are superior to cobalt catalysts in processes designed to produce good quality gasoline. In other words, where the catalyst is cobalt the product of the synthesis contains mostly straight chain paraffins and paraffin wax. The process employing iron forms a gasoline product highly olefinic and, therefore, of high octane rating. The temperatures employed when using iron may be as high as about 650° F. and at least around 500° F., in the reaction zone which temperatures are 100° to 200° F. higher than those employed in the cobalt process. Good results are obtained in the hydrocarbon synthesis process using an iron catalyst where elevated pressures are employed in operating the process. Thus, pressures of at least 250 lbs./sq. in. maintained in the reaction zone tend to reduce carbon formation on the catalyst.

I have reviewed briefly the prior art relating to hydrocarbon synthesis. To explain my present invention more fully, it should be pointed out that my improvements relate primarily to powdered metal catalysts to be employed in so-called fluid catalyst type of operation. By fluid catalyst operation, I refer to a process in which powdered catalyst is suspended in the gasiform material in the reaction zone to form a dense, turbulent ebullient suspension of solids in gasiform material. This suspension is formed by controlling the superficial velocity of the gasiform material, etc., passing upwardly in the reaction zone. Broadly, this technique is known in the prior art and practiced commercially in catalytic cracking. However, my catalysts may be used in the form of pills and/or granules and employed in a stationary bed or beds of catalyst, in the reaction zone, rather than employed in the fluid bed process previously mentioned.

One object of my invention is to prepare a catalyst adapted to catalyze the reaction between carbon monoxide and hydrogen to form hydrocarbons and oxygenated hydrocarbons, or to hydrogenate or dehydrogenate hydrocarbons and oxygenated hydrocarbons.

Another object of my invention is to prepare an iron hydrocarbon synthesis catalyst adapted for use in powdered form in a fluid catalyst process.

Another object of my invention is to prepare an iron catalyst adapted for use in a hydrocarbon synthesis process, which catalyst is resistant to attrition, retains its activity for an extended period of time, is selective in its action and may be used without promoters.

Other and further objects of my invention will appear from the following more detailed description and claims.

To the accomplishment of the foregoing and related ends, I prepare a metal catalyst by reacting metallic oxides with aluminum under conditions more fully explained hereinafter.

Now while as indicated, my process is of general application, an important aspect of it relates to preparing iron catalysts adapted for use in hydrocarbon synthesis and I shall proceed to describe one preferred modification of my invention in terms of its application to hydrocarbon synthesis with the understanding that the principle of my invention includes other reactions, such as hydrogenation and dehydrogenation of hydrocarbons, ketones, organic acids, etc.

In preparing an iron catalyst adapted for use in hydrocarbon synthesis I may proceed according to the following specific examples.

*Example 1*

Forty parts by weight of $Fe_2O_3$ and 6 parts of powdered aluminum (i. e., 13% aluminum approximately) were mixed in a clay receptacle. The mixture was ignited. A violent exothermic reaction occurred which was completed in a relatively short time. The product was permitted to cool to room temperature. It was a hard porous mass resembling volcanic lava. It was also strongly magnetic.

*Example 2*

Example 1 was repeated, but 10 parts by weight CuO and 1 part MnO were mixed with 77 parts $Fe_2O_3$ and 13 parts Al (powder). The finished product had physical properties similar to the product of Example 1.

*Example 3*

Six parts by weight of aluminum powder were mixed with 95 parts of magnetite ($Fe_3O_4$), (These proportions represent about one-half of the stoichiometric amount of $Al_2O_3$). When ignited, this product did not burn with the violence displayed in the process of Example 1, and combustion had to be maintained by means of an external flame. The resulting product was nodular in form, resembling "Brain Coral." It was brittle and easily broken into granules but had a hardness of seven[1] and scratched glass. It was also highly magnetic.

I may use any oxide of iron, i. e., FeO, $Fe_2O_3$, or $Fe_3O_4$, being careful to use an amount of aluminum powder which will react with about 50 per cent of the oxygen.

This catalyst (Example 3) was tested in a hydrocarbon synthesis reaction under the following conditions and with the below results:

Temperature in the reaction zone_____ 600° F.
Pressure in the reaction zone_____ 250 lbs.
Ratio of $H_2$ to CO (volumetric) in feed_ 2.1 to 1
Per cent CO converted_____ 92
Yield of liquid product per cubic meter of ($H_2$+CO) measured at 60° F. and 1 atmosphere pressure [2]_____ 208 cc.

If the materials are present in stoichiometric quantities, a fused mixture of alumina ($Al_2O_3$) and metallic iron is the product. If aluminum is in excess, a homogeneous mixture of aluminum, alumina and alloy is formed. If, on the other hand, a smaller quantity of aluminum is used, a mixture of alumina, iron and magnetite results. If it is found that $Na_2O$, KF or other chemicals are of value as promoters, the compound which will produce such a promoter after heating is included in the mixture and fused with the main ingredients. It is thus possible to blend these foreign materials to the best advantage. In all cases the cooled product is a hard, porous substance resembling slag or lava. It can easily be broken up to pieces of the desired size, but is resistant, nevertheless, to attrition. The hardness of the usual product is, as stated, about 7 [1], i. e., it scratches glass but is not easily scratched by a file. Most products are strongly magnetic.

On the surface the method employed is similar to the well-known thermit process used for welding. However, the thermit mixture is one which results mostly in metallic iron, which is not porous or easily granulated, and does not contain slag.

I have found that the use of iron oxides is not essential in the production of catalysts by my method and that oxides of Cr, Co, Th, Ni and Cu may be used, either alone or in combination.

I also do not wish to be limited to the process which uses the oxidation of aluminum in the presence of oxides by induced combustion to produce these catalysts. Aluminum and metallic oxides may be heated in a furnace at controlled temperatures to produce my catalysts.

By a similar procedure, I may reduce other metal oxides to produce, say, copper, nickel, chromium, etc., in a physical form more suitable for use as a catalytic material.

To recapitulate, I have found a method for producing catalysts in a form more suitable as catalysts. I fuse aluminum in powdered form

[1] On the mineralogical scale (on the scale, talc=1, diamond=10).
[2] Yields of over 200 cc. per cubic meter of ($H_2$+CO) are considered good in the present art.

with a heavy metal oxide in various proportions and form a catalytic material resistant to attrition, yet capable of being ground to a powder.

I have found that a mixture containing from 10 to 20 weight per cent aluminum (the balance being $Fe_2O_3$) gives an active catalyst when treated as above, i. e., reacted together to form metallic iron and $Al_2O_3$. Higher percentages of aluminum as well as lower percentages give a less active catalyst. Best results are obtained mixing 13 per cent powdered aluminum with 87 per cent $Fe_2O_3$ and causing the above reaction to take place.

In preparing the catalyst, ignition may be started as by momentary contact with the flame of an acetylene torch. Where 18 to 54 per cent aluminum powder is present, combustion sustains itself after ignition. With the 13 per cent aluminum content, it is necessary to apply a flame until the top layer has been melted, after which the reaction will be self-sustaining.

By proper known procedures my catalyst may be formed into pills, pellets, powder, macrospheres, or microspheres.

Instead of using powdered aluminum, I may use powdered amorphous silicon.

I made six hydrocarbon synthesis runs using 13 per cent powdered aluminum fused with 87 per cent $Fe_2O_3$, and found the catalyst, properly promoted, to be an active catalyst. The catalyst contained from 1 to 5 per cent of $K_2CO_3$, KF or $K_2O$ and I found that using 5 per cent promoter (i. e., 5 per cent of the iron oxide plus aluminum) and when operating at around 600° F. and superatmospheric pressure, conversion of 216 to 227 cc. of a liquid product ($C_4$+hydrocarbons) per cubic meter of CO+$H_2$ were obtained. These yields were obtained in both fixed bed and fluid catalyst processes and are considered good. The amount of aluminum used corresponds to one-half the theoretical amount required in the equation:

$$Fe_2O_3 + 2Al = 2Fe + Al_2O_3$$

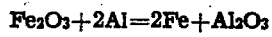

Numerous modifications of my invention may be made by those skilled in the art without departing from the spirit thereof.

What I claim is:

1. The method of forming hydrocarbons and oxygenated hydrocarbons synthetically which comprises reacting carbon monoxide and hydrogen in the presence of a catalyst consisting essentially of alumina, iron metal and magnetite formed by reacting iron oxide with about one-half of its stoichiometric weight of powdered aluminum by a reaction wherein at least a portion of the heat requirements are supplied from an external source, at elevated temperatures and pressures, and thereafter grinding the product to a powder, the catalyst being in the form of a fluidized mass in the reaction zone.

2. The method of forming hydrocarbons and oxygenated hydrocarbons synthetically which comprises reacting carbon monoxide and hydrogen in the presence of a fluidized catalyst consisting essentially of alumina, iron metal and magnetite in a reaction zone by charging a mixture of carbon monoxide and hydrogen to said reaction zone maintained at an elevated temperature and pressure which are suitable for said reaction in the presence of an iron catalyst and permitting the reactants to remain in the reaction zone for a sufficient period of time to effect the desired conversion, the catalyst being formed by reacting powdered aluminum, at elevated temperatures, with about twice its stoichiometric weight of Fe$_2$O$_3$ to form a hard, brittle mass, which mass is ground to a powder, at least a portion of the heat requirements for said catalyst formation reaction being supplied from an external source.

3. The method set forth in claim 2 in which the amount of aluminum reacted is from 10 to 18 weight per cent of the total of the iron oxide and the aluminum.

4. The method of claim 2 in which the catalyst is formed by reacting 13 weight per cent powdered aluminum with 87 weight per cent of Fe$_2$O$_3$.

5. The method set forth in claim 1 in which the catalyst contains a promoter comprising a potassium compound.

6. The method set forth in claim 2 in which the catalyst contains a promoter comprising a potassium compound.

7. The method of forming hydrocarbons and oxygenated hydrocarbons which comprises contacting at an elevated temperature of at least about 500° F. a gas mixture containing carbon monoxide and hydrogen with a catalyst consisting essentially of alumina, iron metal and magnetite formed by reacting powdered aluminum with Fe$_2$O$_3$, the amount of aluminum powder being from 10 to 20 weight per cent of the aluminum-iron oxide mixture and at least a portion of the heat requirements of said catalyst-forming reaction being supplied externally.

JERRY A. PIERCE.

REFERENCES CITED

The following references are of record in the file of this patent:

UNITED STATES PATENTS

| Number | Name | Date |
| --- | --- | --- |
| 1,489,497 | Larson | Apr. 8, 1924 |
| 1,618,004 | Greathouse | Feb. 15, 1927 |
| 1,909,442 | Williams | May 16, 1933 |
| 2,167,004 | Pier et al. | July 25, 1939 |
| 2,211,022 | Michael | Aug. 13, 1940 |
| 2,234,246 | Groombridge et al. | Mar. 11, 1941 |
| 2,254,806 | Michael | Sept. 2, 1941 |
| 2,309,034 | Barr | Jan. 19, 1943 |
| 2,360,787 | Murphree | Oct. 17, 1944 |
| 2,461,570 | Roberts | Feb. 15, 1949 |